M. E. WIDELL.
FEEDING DEVICE FOR SLITTERS.
APPLICATION FILED SEPT. 13, 1919.
1,418,117.
Patented May 30, 1922.
8 SHEETS—SHEET 7.
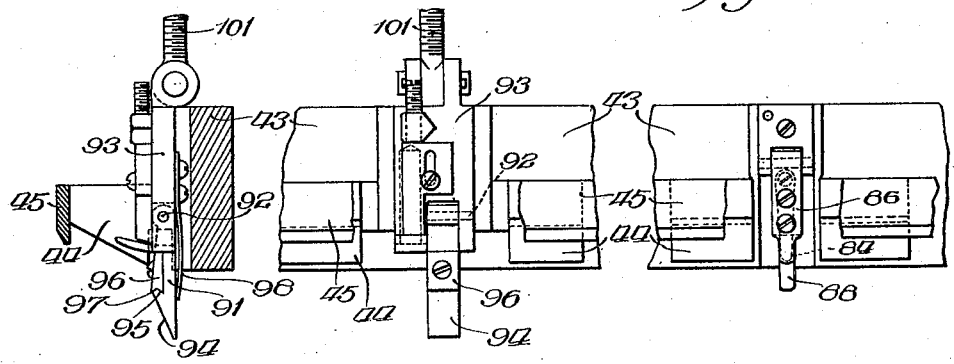
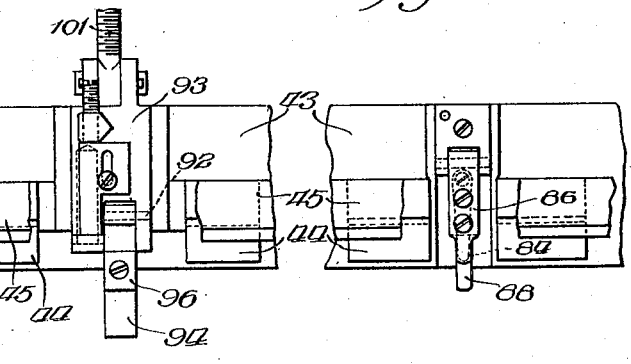
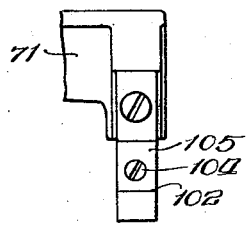
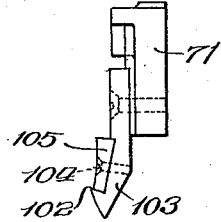
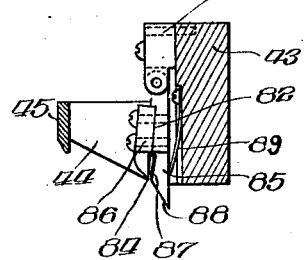

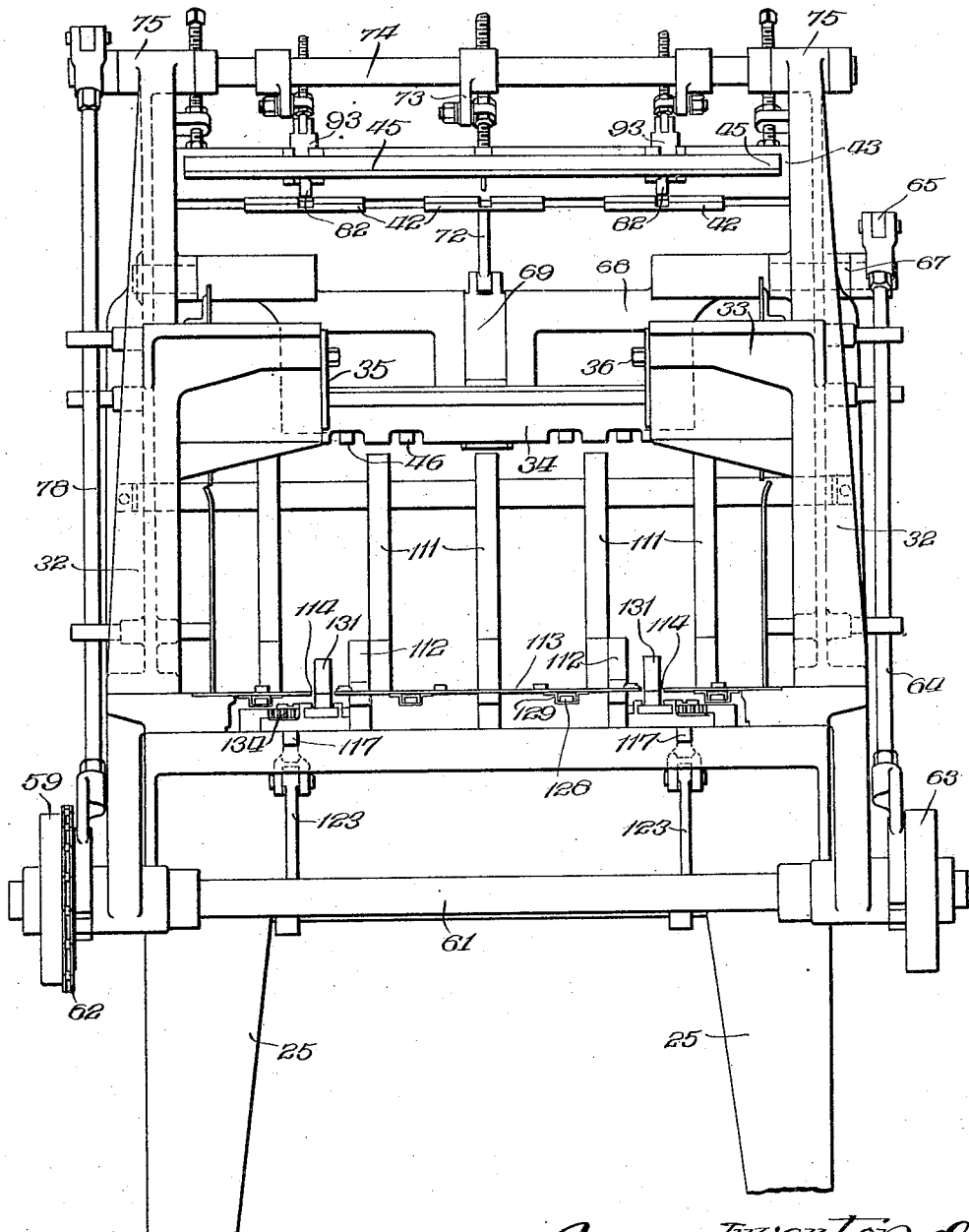

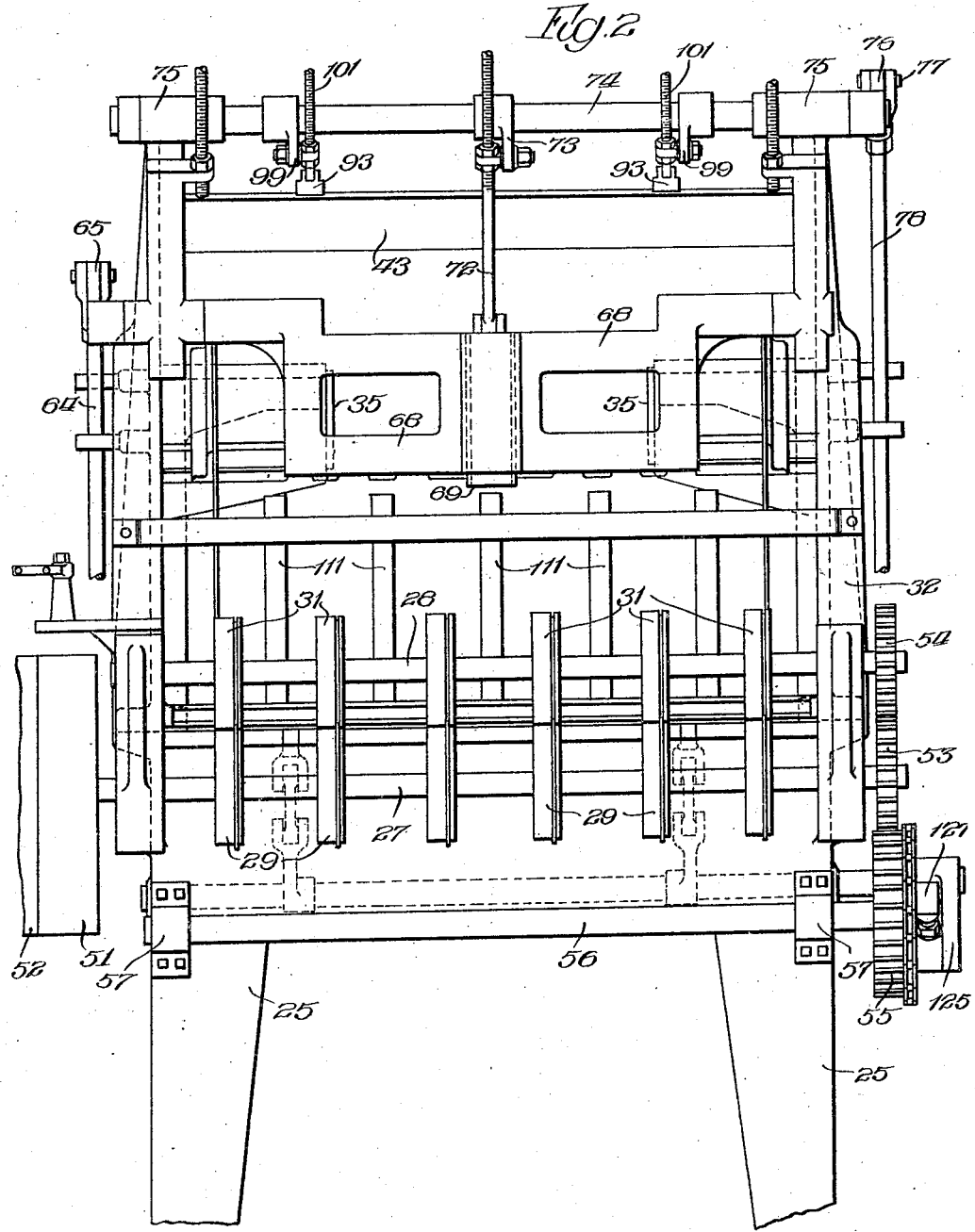

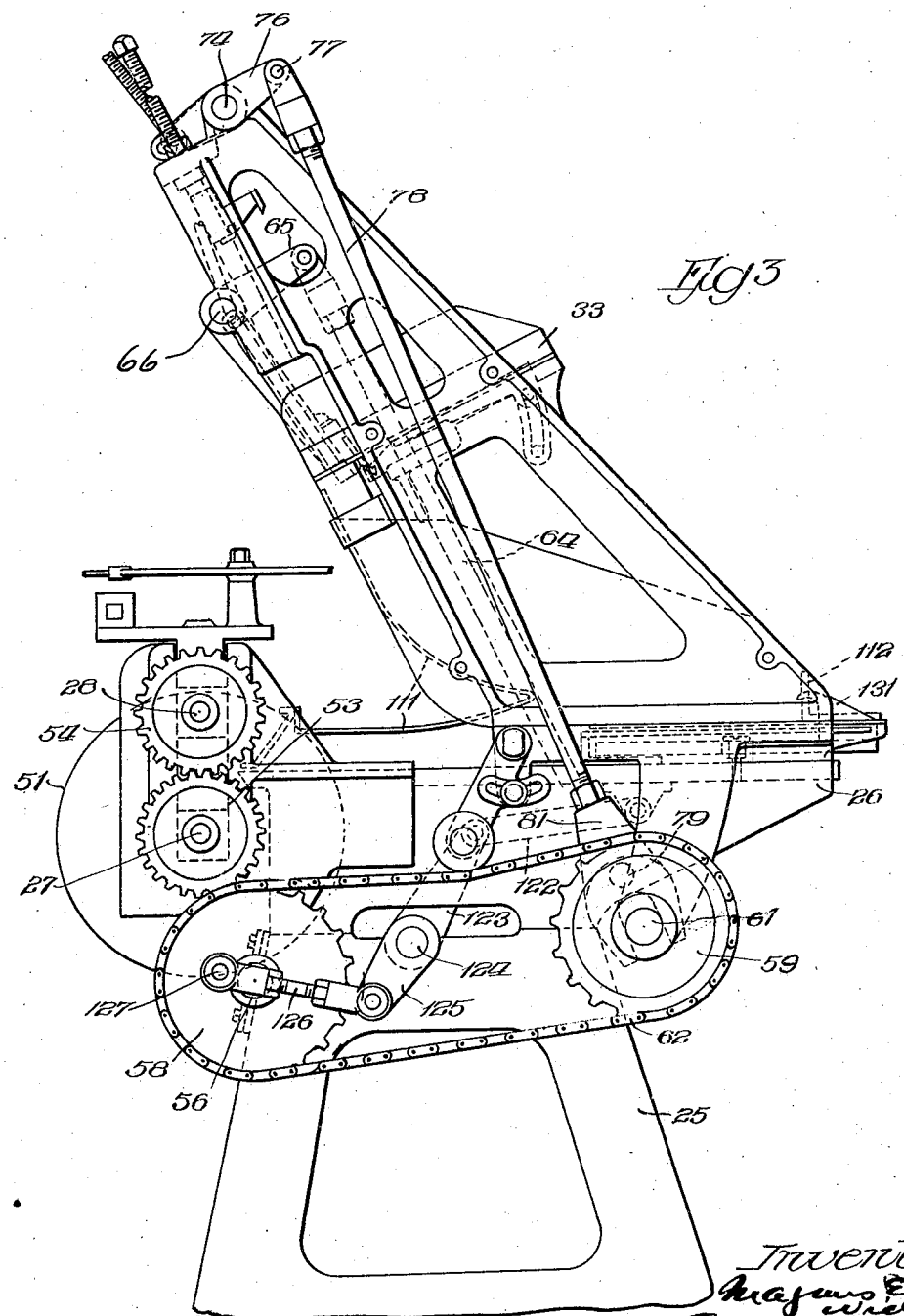

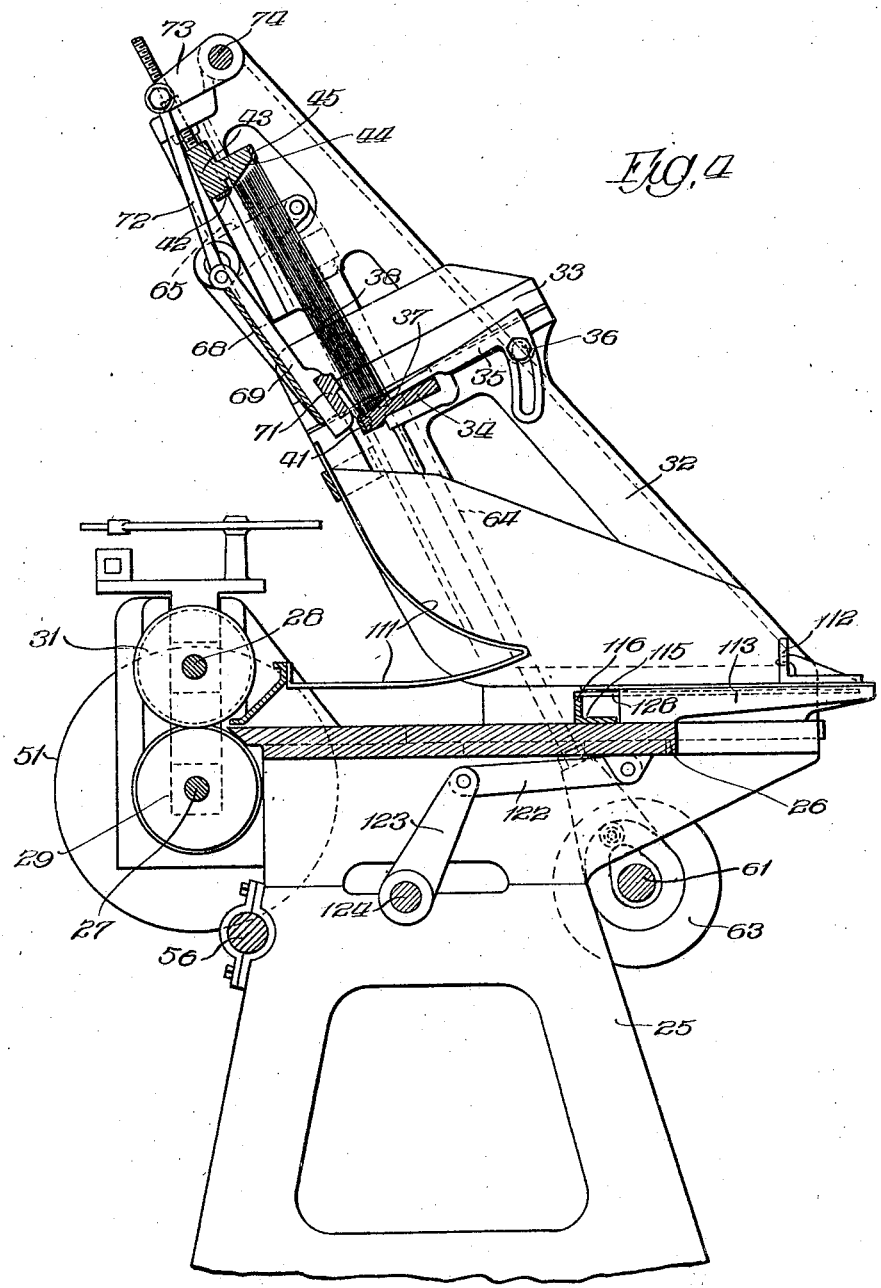

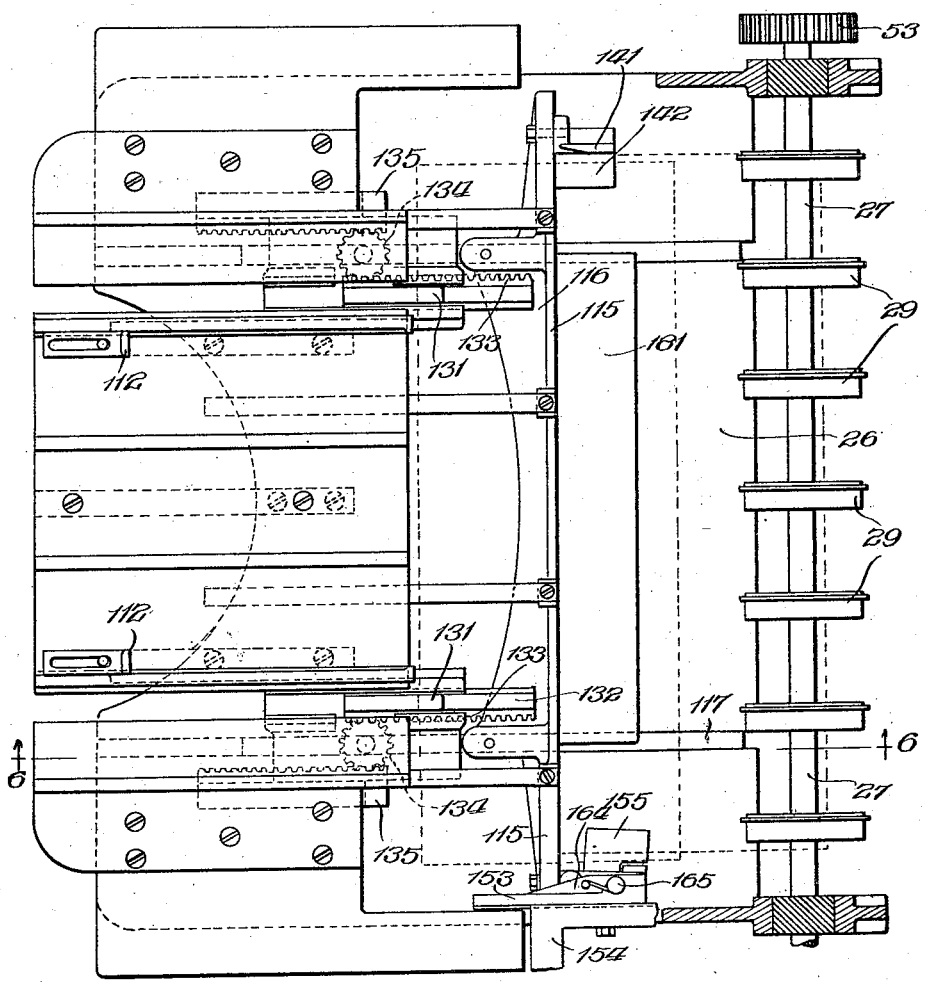
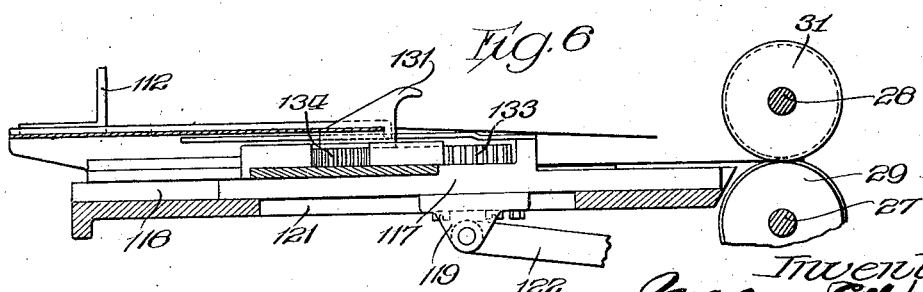

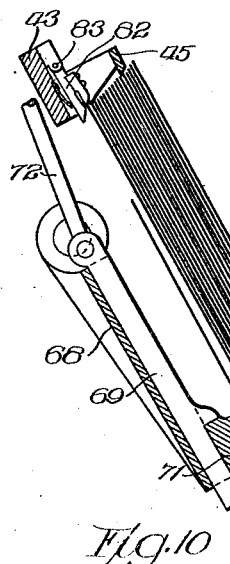
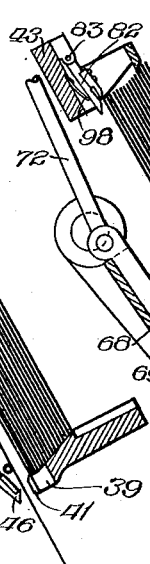
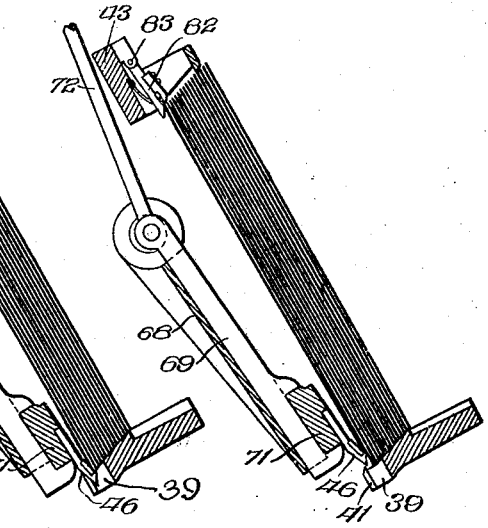
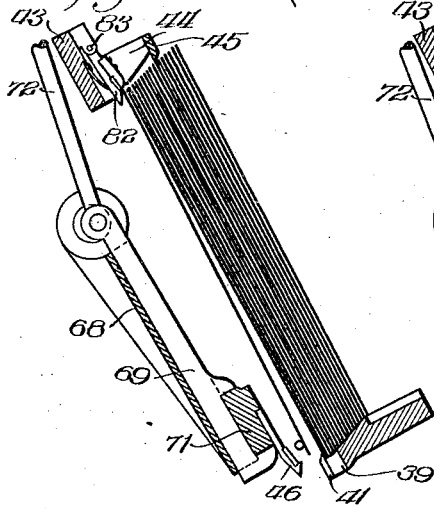
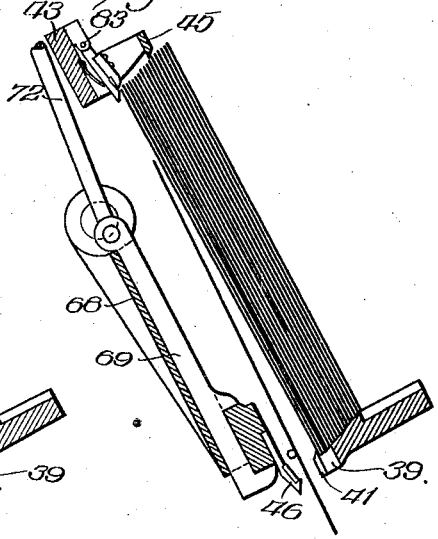

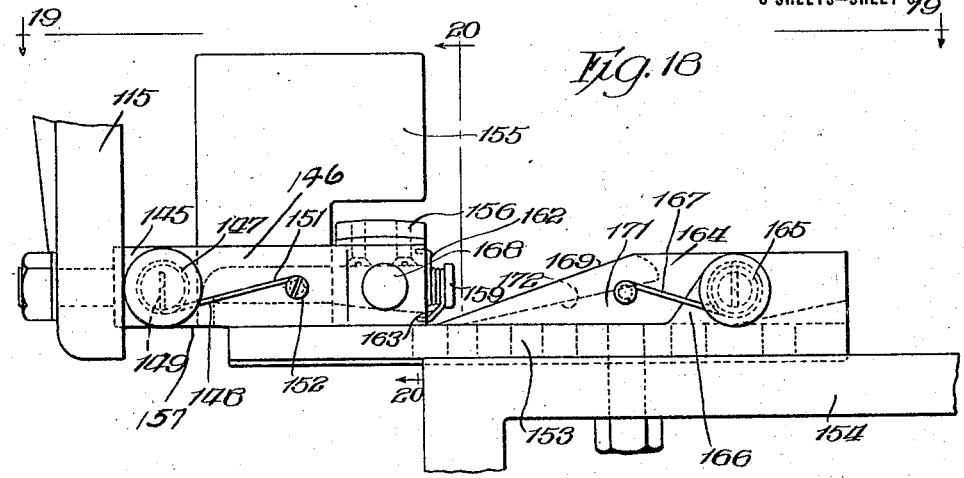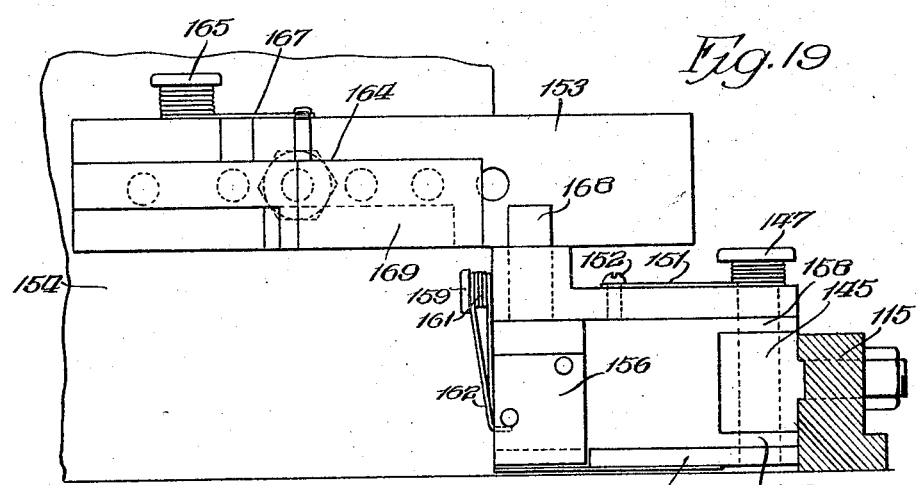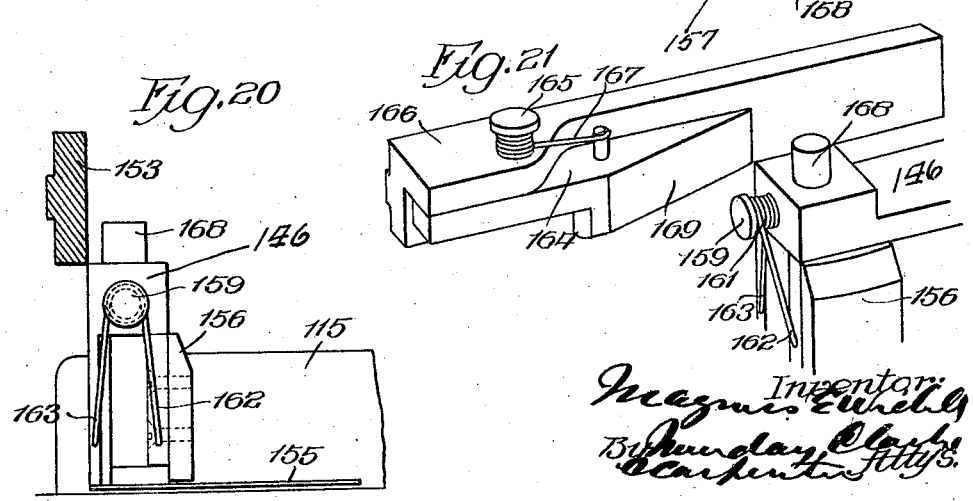

UNITED STATES PATENT OFFICE.

MAGNUS E. WIDELL, OF MAYWOOD, ILLINOIS, ASSIGNOR TO AMERICAN CAN COMPANY, OF NEW YORK, N. Y., A CORPORATION OF NEW JERSEY.

FEEDING DEVICE FOR SLITTERS.

1,418,117.  Specification of Letters Patent.  Patented May 30, 1922.

Application filed September 13, 1919. Serial No. 323,556.

*To all whom it may concern:*

Be it known that I, MAGNUS E. WIDELL, a citizen of the United States, residing at Maywood, in the county of Cook and State of Illinois, have invented a new and useful Improvement in Feeding Devices for Slitters, of which the following is a specification.

This invention relates in general to automatic feeds for machines handling tin plate or other sheet metal and more particularly to an automatic feed provided for the feeding of tin plate or other metal sheets to the rotary cutters of a slitting machine adapted to divide the sheet or blank into a number of parts of smaller predetermined dimension. The present invention has for its purposes much the same purposes as the invention in an application of Clarence M. Symonds, filed June 12, 1919, and identified by Serial No. 303,663, the present invention relating more particularly to the provision of an improved machine or apparatus of the character described in said application.

The invention has for an important object the provision of an automatic feed, which while permitting the metal sheets to be cut by the cutters in the usual fashion, may be attached to or form a part of the slitter without interfering in any manner with the cutting rolls and without increasing at all the difficulties of adjusting or grinding the rolls or performing other operations upon or with them.

Another and highly important object of the invention is the provision of an automatic feed that will feed the sheets of metal in between the slitting rolls at or nearly at the maximum capacity of such rolls to receive them. It will, of course, be understood that the rolls themselves are provided with means for advancing the sheets as the cutting progresses, the speed of the sheets through the rolls being the same as the peripheral speed of the cutters. The maximum output therefore at any given speed is attained by delivering the sheets to the rolls in succession with minimum intervals between succeeding sheets and this my invention contemplates.

A still further object of the invention is the provision of means for accurately and positively arranging the sheets in accurate relation with respect to the rolls at the time they are received therebetween.

A still further object of the invention is the general improvement of the machine of said Symonds application through the shortening of the length of the reciprocating movement necessary in advancing the sheets and through numerous other means as will be apparent.

Numerous other objects and advantages of the invention will be apparent as it is better understood from the following description when considered in connection with the accompanying drawing illustrating a preferred embodiment thereof.

Referring to the drawing,

Figure 1 is a front elevation of an apparatus embodying my invention;

Fig. 2 is a rear elevation thereof;

Fig. 3 is a side elevation taken from the left hand side;

Fig. 4 is a vertical front-to-back section through the machine or apparatus;

Fig. 5 is a horizontal section taken just above the bed and cutting rolls;

Fig. 6 is a section taken substantially on the line 6—6 of Fig. 5;

Figs. 7 to 11 are detail sections considerably enlarged, and showing the selection and delivery of the sheets one by one from a stack;

Figs. 12 to 17 are enlarged details of certain parts of the sheet selecting mechanism;

Fig. 18 is a partial enlarged top plan view of one side of the sheet alining mechanism;

Fig. 19 is a section taken substantially on the line 19—19 of Fig. 18;

Fig. 20 is a section taken substantially on the line 20—20 of Fig. 18; and

Fig. 21 is a perspective of certain of the active parts of the mechanism shown in Figs. 18 to 20.

Although the invention is shown for the purpose of illustration on the drawing as embodied in an apparatus resembling in certain particulars the apparatus in said Symonds application, it will be manifest as the invention is better understood that from certain aspects it is capable of valuable use in machines and apparatus otherwise constructed.

For the purpose of illustrating the invention I have shown on the drawing (Fig. 4)

a frame 25 supporting a table or bed 26 and two shafts 27 and 28 on which are mounted cutters or cutting rolls 29 and 31. It is intended that the metal sheets be fed edgewise, and endwise of the machine, across this bed and in between the cutting rolls which serve to shear each sheet into a plurality of strips.

At each side of the bed a wing 32 extends up and rearwardly from the forward edge. Each of these wings is provided with an inwardly extending bracket 33 to which is secured a bottom plate 34 held in arms 35, each said arm 35 having an adjustable connection with the bracket 33 as indicated at 36. The plate 34 is the bottom plate of a stack support and is provided with an inclined operative part 37 on which the sheets of a stack 38 of plates rest as may be observed in Fig. 4. At the rear edge of the bar or plate 34 recesses 39 are provided as may be seen in Figs. 7 to 11 and back of these recesses and between them are provided upwardly extending lips 41 which serve to hold the lower edge of the rearmost sheets of the stack from slipping off the bottom plate. The upper edges of the plates in the stack rest against blocks 42 (Figs. 1 and 4) arranged at intervals up on a top bar 43 carried in the wings 32. The top bar 43 is provided with an appropriate number of outstanding arms 44 which carry at their forward ends a plate 45 for maintaining the sheets in desired vertical registration, the plate 45 being bevelled at its lower edge as indicated.

It will be noted that the sheets are held in the stack in an inclined position and it is intended that in the feeding operation the bottommost sheet, i. e., the rearmost, will be selected, separated from the stack and dropped upon the bed into position to be pushed forward into engagement by the rollers. The separating mechanism comprises in the present instance a number of hooks 46 (Figs. 7 to 11) which are thrust forward into the recesses 39 into position to engage the lower edge of the rearmost sheet. When thus positioned the hooks are lifted as indicated in Fig. 9 to raise this sheet and then the hooks are swung backwardly to pull the lower edge of the sheet clear of the lips 41 and clear of the stack so that it may drop down by gravity when the support of the sheet is withdrawn, all as will be more fully hereinafter explained.

Referring to Figs. 2 and 3 it will be noted that shaft 27, already mentioned as being one of the roll carrying shafts, is provided with a power pulley 51 and an idle pulley 52. At the other end this shaft carries a gear 53 meshing with a gear 54 upon shaft 28 and also with a gear 55 upon a shaft 56 carried in bearing brackets 57 from the main frame. Gear 55 or shaft 56 is provided with a sprocket wheel 58 which serves to drive a sprocket wheel 59 upon a sprocket shaft 61 at the front of the machine and this through a sprocket chain 62 co-operating with the two sprockets 58 and 59. The shaft 61 carries a cam 63 at the right hand side of the machine. This cam serves to vertically reciprocate a bar or rod 64 (Fig. 1) connected to a crank arm 65 fast on the end of a stud or rock shaft 66 which extends through a bearing 67 and is formed rigid with an oscillating plate or frame 68. This plate is grooved to receive a sliding arm 69 (Fig 4) which carries in its lower end a cross bar 71 in which the hooks or fingers 46 are fastened. The slide arm 69 is connected at its upper end by a link 72 with an arm 73 which extends out from and is fast upon a shaft 74. This shaft has bearings at 75 in the top of the wings and at its left hand end is provided with an arm 76 rigidly fastened thereon and pivotally connected at 77 with a rod or bar 78 having at its other or lower end a roller 79 engaging in a cam face on the back of the sprocket wheel 59. Each of the rods or bars 64 and 78 carries at its lower end a bifurcated or slotted head 81 which embraces the shaft 61, the cam slots being of a character to give the rods a movement to swing the arms 65 and 76 to oscillate the shafts 66 and 74 respectively and at the proper intervals and in proper relation with each other and with the action with other parts of the apparatus.

Referring again to Figs. 7 to 11, Fig. 7 shows the arrangement of the parts as a sheet is falling from the stack; thereafter cam 63 moves the bar 64 to swing the frame 68 in toward the stack bringing the hooks to the position shown in Fig. 8, i. e. into the recesses 39 and into position to engage the edge of the rearmost sheet; thereafter and while the parts hold the frame 68 in the position assumed the shaft 74 is oscillated to pull up the slide, lifting the hooks to the position shown in Fig. 9. When in this position further movement of the cam 63 causes the frame to swing back to its normal inoperative position and at the same time the hook is moved downwardly into the position shown in Fig. 7.

The upward movement of the hook has raised the sheet and its rearward movement has swung its bottom edge away from the stack. When the sheet is lifted its upper edge is gripped and held against downward movement at the instant when the hook is returned to normal position so that the sheet is left suspended in the device holding it up as just described.

This device consists of a pair of callipering jaws 82 pivotally mounted at 83 on bar 43. The arrangement of these jaws is shown in the figures last mentioned and the construction of them in Figs. 17 and 14 upon an enlarged scale. Viewing Fig. 17 it will be noted that the arms 44 are slotted at 84 and the upper edge of the sheet is intended to be pushed up in to the slots thus provided. The callipering jaws 82 consist of two members 85 and 86 providing between them a slot 87 accurately dimensioned to permit the easy insertion of one sheet and to prevent the insertion at all of two sheets. These jaws have a common inclined forward face 88 up which the upper edge of the sheet is pushed in being raised. This movement of the sheet depresses a spring 89 located back of the jaws. This depression of the spring continues until the two slots (in the jaws and in the arms 44) are brought into registration and the edge of the sheet enters them. The spring 89 pushes outwardly on the underface of the calliper member 86 and holds the sheet thus elevated until means presently to be described are moved down upon the top of the sheet to press it out of the holding members. This occurs after the lower edge of the sheet is freed and results in a dropping of the sheet toward the bed.

The delivery members just mentioned comprise a pair of fingers best shown in Figs. 12 and 13. Each finger consists of a body piece 91 pivoted at 92 to a vertical slide 93 carried by the bar 43. The lower forward face 94 of the body 91 is sharply bevelled and at the top of this face is provided a recess 95 in which is fixed a hardened steel inset 96 providing a minute shoulder 97 extending out over and beyond the top of the inclined face 94. A spring 98 pushes the finger toward the front of the machine to insure its being in position to engage and slide over the upper edge of the plate or sheet as the sheet is raised, and to insure engagement with the shoulder 97 when the slide 93 is pushed down to free the sheet from its sustaining devices. Actuation of the fingers 82 is accomplished from the shaft 74 and to this end arms 99 are fast on this shaft and are connected by stems or shanks 101 of the slides 93, the arrangement being such that these slides descend just after disengagement by the hooks.

Particular description of the hooks is not thought necessary although a complete showing is presented in Figs. 15 and 16, in which it will be noted that the hook part is a minute shoulder upon a hardened steel body 103, the shoulder being a minute part 102 extending out beyond the outer face 104 of the wear sustaining block or inset 105.

When the sheet is dropped it encounters a guide 111, which deflects it toward the front of the machine, i. e., away from its direction of feed into the space between the rolls. The guide 111 may be of any suitable form, sheet metal bars being used in the present instance. The forward movement of the sheet is stopped by stops 112 carried upon an elevated platform 113 located at the front of the bed and above it. This platform 113 is slotted at 114 to accommodate reciprocating feeding devices which advance the sheet into the rolls. In order to shorten the reciprocating motion of these feeding devices and to permit the location of the stack and selective means well away from the cutting rolls so that the cutting rolls may be readily accessible for grinding and other purposes, the construction and arrangement of the parts is such that the feeding movement of the sheet is a two-motion one. That is to say, each sheet is fed forward part of the distance at one reciprocation and the remainder of the distance at the next. The present arrangement further provides for the receiving of a sheet at each reciprocation so that as each sheet is moved forward to be engaged by the rolls the next following sheet is also being moved forward in its first advancing step. If desired the two sheets may overlap without interference with the feeding action.

The feeding is accomplished by a reciprocating device comprising an angle bar 115 having its vertical part 116 extending to just beneath the top surface of the platform 113 and when in retracted position being disposed closely adjacent the rear edge thereof. It is this bar that accomplishes the final feeding into the roll and it is mounted upon two slides 117 carried in grooves 118 in the bed and having downwardly projecting ears 119 extending through slots 121 beneath said recesses. These ears are connected by links 122 with oscillatory arms 123 upon a cross shaft 124 carried in the frame. The left hand end of this shaft is provided with an arm 125 connected by a pitman or connecting rod 126 with a crank pin 127 (Fig. 3). This construction imparts continuous reciprocation to the bar 115. This bar, it may be mentioned, is guided in its motion by straps 128 sliding in keepers 129 (Fig. 1) on the lower face of the platform. The sheets are delivered in front of the bar 116 by a pair of hook members 131 mounted on slides 132 (Figs. 5 and 6). These slides are mounted alongside the slides 117 and are provided with racks 133 which mesh with pinions 134 carried by the slides 117, each pinion also being in mesh with a fixed rack 135 mounted beneath the platform in proper position. It is thus seen that the hooks have a longer and faster travel than has the bar 115. When retracted the hook members are behind or in registration with the stops 112 and the bar 115 is at the rear edge of the platform. The sheet is first thrust forward by the hook members a distance to bring its rear edge appreciably in front of the forward edge of the platform and in front also of the position to be assumed by the bar 115 when retracted. There it remains when the parts return on their idle stroke having dropped down in front of the bar 115. On the next movement of this bar in feeding the sheet is pushed forward sufficiently to permit its engagement by the rolls.

In other words the operation is that the first sheet is received from guide 111 and its front edge abuts against the fixed stop 112. Thereupon the feed bar 115 advances (without propelling any sheet) and at the same time the feed members 131 advance with greater or twice the rapidity of the movement of the bar 115 and deposit the sheet which they are propelling with its rear edge resting on the table and its front edge resting on the top of the bar 115, thereupon both of the feed elements recede and the front edge of the first sheet drops in front of the bar 115 as the latter passes from under the sheet. When the feed members are in their rearmost position the second sheet comes from the guide against the stop 112, and on the forward movement of the two feeding devices the bar 115 propels the first and lower sheet into the grip of the slitting rolls, and at the same movement the feed members 131 propel the second and upper sheet so that it overlaps above the first sheet more or less and the rear edge of the second sheet will be relatively close to the slitting rolls and will be introduced between them by a relatively short advance of the bar 115 on its next advance. Thereafter the above described movements are repeated indefinitely, the stack 38 of the sheets being renewed from time to time to keep up a constant supply for the feeding devices. It is apparent that the two-movement horizontal feed is of material advantage in a machine in which the initial feed of the sheet depends upon gravity from a substantially upright position because the sheet requires considerable longitudinal space within which the guide may change its position to a horizontal one. In a suitably compact machine the fixed stop 112 must therefore be placed at a greater distance from the slitting rolls than would otherwise be advantageous. In the machine illustrated the said overlapping of the sheets is or may be rather more than one-half of the dimension of the sheets from front to rear. It will be understood that as soon as this overlapping is at its greatest extent the slitting rolls withdraw the lower sheet, and during such withdrawal the bar 115 makes its short idle recession, and the feed members 131 make their long movement in the same direction.

In order that the sheets may be accurately arranged when they enter between the rolls I have provided new and improved devices co-operating with the feeding mechanism for moving them transversely of the line of feed into accurate position. At the left hand side of the machine the bar 115 is provided with a stop 141 fixed on the bar and comprising a member extending up from a base 142, this base being provided in order that the edge of the sheet may not be thrust under the stop. At the other or right hand side a movable stop or head 156 indicated in Figs. 18 to 21, is provided. Figure 18 is a plan view of this stop mechanism. Extending forward from the end of the bar 115 is a block 145 to which is hinged a stop-carrier 146 by a hinge pin 147 held against turning in the block 145. A spring 148 embraces the upper edge of the hinge pin and has an end 149 inserted thereinto, the other end 151 engaging a screw or projection 152 on the top of the carrier and holding it over in engagement with a fixed wall 153 carried by a side bar 154 of the frame. The carrier 145 is provided with an inwardly extending plate 155 upon which the sheet being fed must drop. The movable stop comprises a head 156 having a tail 157 also embracing the hinge pin at 158 (Fig. 19). In the end of the carrier is provided a pin 159 about which is disposed a body 161 of a spring, one arm of which 162 is engaged in the head of the stop and the other arm 163 in the body of the carrier, this spring tending to hold the parts in the relation shown in Fig. 21 and giving the stop a yielding action to eliminate objectionable results from variation in the dimension of the sheet being fed. A stop guide 164 is pivotally mounted upon a pin 165 in a lug 166 extending out from the fixed wall 153, a spring 167 is provided to normally hold the stop guide in the position shown in Fig. 18. Extending up from the carrier 145 is a round post or roller 168 and when the bar 115 moves in its feeding stroke this post engages an inclined face 169 of the stop guide, moving the carrier over against the force of the spring 148 and through the engagement of the adjacent edge of the sheet by the stop 156 the sheet is moved over until it engages the fixed stop of the machine, further movement of the carrier being permitted by yielding of the spring 161. The stop guide 164 is recessed beyond and behind the inclined face 169 as indicated by reference character 171. On the return stroke of the bar 116 the post or roller 168 enters the recess 171 having been as stated pushed to the right, by the spring 148. Further movement of it on the return stroke brings it into contact with an internal face 172 inclined at or about the same inclination of the face 169. This swings the stop guide around out of the way and against the action of the spring 167 permitting it to return without having influence upon the position of the sheet.

Referring again to Fig. 5, it will be noted that a plate 181 extends out from the lower edge of the bar 115 and this in order that the plates or sheets may not be forced under the bar in the feeding movement.

It will be manifest from the foregoing that the speed of the mechanism herein described may be of extraordinary rapidity and that it may closely approximate the maximum capacity of the slitter. The feeding action may be provided in steps of varying relative amounts, the relation of said steps having direct bearing upon the interval provided between the entrance of the sheets into the slitters. The plates may temporarily overlap each other as has been stated.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An automatic feed for a slitter for cutting metal sheets and between which the sheets are fed across a bed, comprising in combination a holder for a stack of sheets and sheet blanks, means for removing a sheet from said stack and depositing it by gravity into feeding position upon the bed, and a two motion feed automatically engaging said sheet and advancing it progressively into engagement with said cutter, and means for delivering sheets successively from said holder to an element of said two-motion feed and in a forward direction opposite to the rearward direction of feeding.

2. An automatic feed for a slitter for cutting metal sheets and having rotary cutters between which the sheets are fed across the bed, comprising in combination a stack holder, means for causing delivery of sheets singly and successively into feeding position on the bed, and a feeding mechanism comprising a plurality of reciprocating members having different rates of motion and successively engaging and advancing each sheet.

3. An automatic feed for a slitter for cutting metal sheets and having rotary cutters between which the sheets are fed across the bed, comprising in combination means for delivering the sheets singly in feeding position, and a plurality of sets of advancing devices successively engaging the sheets fed into the cutters, one of said sets of devices advancing each sheet a greater distance than and over the other preceding sheet.

4. An automatic feed for a slitter for cutting metal sheets and having rotary cutters between which the sheets are fed across the bed, comprising in combination means for delivering the sheets singly into feeding position, and a plurality of sets of advancing devices successively engaging the sheets fed into the cutters, one of said sets of devices advancing each sheet a greater distance than the other and at a faster rate and to a position over the preceding sheet.

5. An automatic feed for a slitter for cutting metal sheets and having rotary cutters between which the sheets are fed across the bed, comprising in combination means for delivering the sheets singly into feeding position, and a plurality of sets of advancing devices successively engaging the sheets fed into the cutters, one of said sets of devices advancing each sheet a greater distance than the other and to a position over the preceding sheet, and one of said devices receiving motion from the other.

6. An automatic feed for a slitter for cutting metal sheets and having rotary cutters between which the sheets are fed across the bed, comprising in combination means for delivering the sheets singly into feeding position, and a plurality of sets of advancing devices successively engaging the sheets fed into the cutters, one of said sets of devices advancing each sheet a greater distance than the other and to a position over the preceding sheet, the movement of the two devices occurring within the same period of time.

7. An automatic feed for a slitter for cutting metal sheets and having rotary cutters between which the sheets are fed across the bed, comprising in combination a stack holder above the bed, means for selecting sheets therefrom and depositing them on the bed, and means advancing the sheets in progressive steps of different rates of speed across the bed whereby to permit the location of said stack holder and selective mechanism away from said cutting rolls.

8. An automatic feed for a slitter for cutting metal sheets and having rotary cutters between which the sheets are fed across the bed, comprising in combination a reciprocating member for advancing the sheets, a fixed side guide located at one end of said member and fastened thereto, a movable side guide at the other end, and an inclined element relative to which the movable side guide is advanced for moving said guide during the feeding movement to accurately position said sheets with respect to the fixed guide.

9. An automatic feed for a slitter for cutting metal sheets and having rotary cutters between which the sheets are fed across the bed, comprising in combination a reciprocating member for advancing the sheets, a fixed side guide located at one end of said member and fastened thereto, a movable side guide at the other end of said member, and an inclined element relative to which the movable side guide is advanced for positively moving said movable guide laterally across the line of feed and during the feeding movement to accurately position said sheets with respect to the fixed guide.

10. An automatic feed for a slitter for cutting metal sheets and having rotary cutters between which the sheets are fed across the bed, comprising in combination a reciprocating member for advancing the sheets, a fixed side guide located at one end of said member and fastened thereto, and a movable yielding side guide at the other end of said member, and an inclined element relative to which the movable side guide is advanced for positively moving said movable guide laterally across the line of feed and during the feeding movement to accurately position said sheets with respect to the fixed guide.

11. An automatic feed for a slitter for cutting metal sheets and having rotary cutters between which the sheets are fed across the bed, comprising in combination a reciprocating member for advancing the sheets, a fixed side guide located at one end of said member and fastened thereto, a movable side guide at the other end of said member, and means located alongside said movable guide in its feeding movement for giving to said movable guide a momentary thrust toward said fixed guide.

12. An automatic feed for a slitter for cutting metal sheets and having rotary cutters between which the sheets are fed across the bed, comprising in combination a reciprocating member for advancing the sheets, a fixed side guide located at one end of said member and fastened thereto, a movable side guide at the other end of said member, and means active during the feeding stroke and inactive during the return stroke for momentarily thrusting said movable guide toward said fixed guide.

13. An automatic feed for a slitter for cutting metal sheets and having rotary cutters between which the sheets are fed across the bed, comprising in combination a reciprocating member for advancing the sheets, a fixed side guide located at one end of said member and fastened thereto, a swinging side guide at the other end, and a swinging member located alongside the path of movement of said swinging side guide and acting to swing said swinging guide toward said fixed guide on the feeding stroke, said swinging member being swung to an inoperative position by said swinging guide on return movement.

14. An automatic feed for handling sheet metal, comprising in combination reciprocating devices receiving the sheets in overlapping relation and advancing said sheets from one reciprocating device to the next, and means whereby one reciprocating device is advanced with greater speed than the other reciprocating device.

15. In a slitting machine, the combination with the slitting rolls, a rear feeding device for introducing sheets successively between said rolls, a front feeding device reciprocable forward and backward with said rear feeding device, and means whereby said front feeding device is given an accelerated motion relative to the motion of said rear feeding device.

16. In a slitting machine, in combination with the slitting rolls, a rear feeding device for introducing sheets successively between said rolls, a front feeding device reciprocable forward and backward with said rear feeding device, and means whereby said front feeding device is given an accelerated motion relative to the motion of said rear feeding device, comprising a turning element carried by the rear feeding device and engaging the front feeding device, and a fixed element engaging said turning element to cause the turning of the same.

17. In a slitting machine, in combination with the slitting rolls, a rear feeding device for introducing sheets successively between said rolls, a front feeding device reciprocable forward and backward with said rear feeding device, and means whereby said front feeding device is given an accelerated motion relative to the motion of said rear feeding device, comprising a pinion mounted to turn on the rear feeding device, and a fixed rack and a rack on said rear feeding device respectively and engaged by said pinion.

18. In a slitting machine, in combination with the slitting rolls, a stack holder for holding a stack of sheets in an elevated position with their edges directed downward, means for separating the sheets successively at their bottom edges from said stack holder to allow the sheets to fall by gravity, means for guiding the separated sheets edgewise and forwardly to a substantially horizontal position, a rear feeding device for introducing the sheets successively between said rolls, a front feeding device receiving said guided sheets, and reciprocable forward and backward with said rear feeding device and means whereby said front feeding device is given a longer movement than that of said rear feeding device.

19. In a slitting machine, in combination with the slitting rolls, a stack holder for holding a stack of sheets in an elevated position with their edges directed downward, means for separating the sheets successively at their bottom edges from said stack holder to allow the sheets to fall by gravity, means for guiding the separated sheets edgewise and forwardly to a substantially horizontal position, a rear feeding device for introducing the sheets successively between said rolls, a front feeding device receiving said guided sheets and reciprocable forward and backward with said rear feeding device, and means whereby said front feeding device is given accelerated motion relative to the motion of said rear feeding device.

20. In a slitting machine, in combination with the slitting rolls, a stack holder for holding a stack of sheets in an elevated position with their edges directed downward, means for separating the sheets successively at their bottom edges from said stack holder to allow the sheets to fall by gravity, means for guiding the separated sheets edgewise and forwardly to a substantially horizontal position, a rear feeding device for introducing the sheets successively between said rolls, a front feeding device receiving said guided sheets and reciprocable forward and backward with said rear feeding device, and means whereby said front feeding device is given accelerated motion relative to the motion of said rear feeding device comprising a turning element mounted to turn on the rear feeding device, devices for actuating said turning element, and means whereby the turning element actuates the front feeding device.

21. In a slitting machine, in combination with the slitting rolls, a stack holder for holding a stack of sheets in an elevated position with their edges directed downward, means for separating the sheets successively at their bottom edges from said stack holder to allow the sheets to fall by gravity, means for guiding the separated sheets edgewise and forwardly to a substantially horizontal position, a rear feeding device for introducing the sheets successively between said rolls, a front feeding device receiving said guided sheets and reciprocable forward and backward with said rear feeding device, and means whereby said front feeding device is given accelerated motion relative to the motion of said rear feeding device comprising a pinion mounted to turn on the rear feeding device, and a fixed rack and a rack on said rear feeding device respectively and engaged by said pinion.

22. In a slitting machine, in combination, a stack holder for holding a stack of sheets in an elevated and inclined position, means for separating the sheets successively at their bottom edges from said stack holder, means for guiding the separated sheets edgewise and forwardly to a substantially horizontal position, a front feeding device to which the sheets are so guided, a rear feeding device at a lower level than said front feeding device and behind which the sheets are delivered by said front feeding device, slitting means to which the sheets are delivered by said rear feeding device, and means for actuating said feeding devices.

23. In a slitting machine, in combination, a stack holder for holding a stack of sheets in an elevated and inclined position, means for separating the sheets successively at their bottom edges from said stack holder, means for guiding the separated sheets edgewise and forwardly to a substantially horizontal position, a front feeding device to which the sheets are so guided, a rear feeding device at a lower level than said front feeding device and behind which the sheets are delivered by said front feeding device, slitting means to which the sheets are delivered by said rear feeding device, means for actuating said rear feeding device to insert the sheet into the slitting means, and means for actuating the front feeding device to advance the next following sheet to a position near the slitting means and over the preceding sheet.

24. In a slitting machine, in combination, a stack holder for holding a stack of sheets in an elevated and inclined position, means for separating the sheets successively at their bottom edges from said stack holder, means for guiding the separated sheets edgewise and forwardly to a substantially horizontal position, a front feeding device to which the sheets are so guided, a rear feeding device at a lower level than said front feeding device and behind which the sheets are delivered by said front feeding device, slitting means to which the sheets are delivered by said rear feeding device, means for actuating said rear feeding device, and means whereby the rear feeding device actuates the front feeding device with a longer motion than its own.

MAGNUS E. WIDELL.